US006973428B2

(12) United States Patent
Boguraev et al.

(10) Patent No.: US 6,973,428 B2
(45) Date of Patent: Dec. 6, 2005

(54) SYSTEM AND METHOD FOR SEARCHING, ANALYZING AND DISPLAYING TEXT TRANSCRIPTS OF SPEECH AFTER IMPERFECT SPEECH RECOGNITION

(75) Inventors: Branimir Konstantinov Boguraev, Bedford, NY (US); James W. Cooper, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 09/864,982

(22) Filed: May 24, 2001

(65) Prior Publication Data

US 2002/0178002 A1 Nov. 28, 2002

(51) Int. Cl.[7] .............................................. G10L 21/06
(52) U.S. Cl. ..................................... 704/251; 704/276
(58) Field of Search ............................... 704/231, 251, 704/276, 277

(56) References Cited

U.S. PATENT DOCUMENTS

| | | | | |
|---|---|---|---|---|
| 5,680,511 A | * | 10/1997 | Baker et al. ................. 704/257 |
| 5,794,189 A | * | 8/1998 | Gould ........................... 704/231 |
| 5,799,273 A | * | 8/1998 | Mitchell et al. ............. 704/235 |
| 5,857,099 A | * | 1/1999 | Mitchell et al. ............. 704/235 |
| 5,884,263 A | * | 3/1999 | Aaron et al. .................. 704/270 |
| 5,963,940 A | * | 10/1999 | Liddy et al. ..................... 707/5 |
| 6,026,388 A | * | 2/2000 | Liddy et al. ..................... 707/1 |
| 6,122,613 A | * | 9/2000 | Baker .......................... 704/235 |
| 6,243,713 B1 | * | 6/2001 | Nelson et al. ............ 707/104.1 |
| 6,545,669 B1 | * | 4/2003 | Kinawi et al. ............... 345/173 |
| 6,611,802 B2 | * | 8/2003 | Lewis et al. ................. 704/235 |
| 6,760,700 B2 | * | 7/2004 | Lewis et al. ................. 704/235 |

* cited by examiner

Primary Examiner—W. R. Young
Assistant Examiner—Michael N. Opsasnick
(74) Attorney, Agent, or Firm—Ryan, Mason & Lewis, LLP; Satheesh K. Karra

(57) ABSTRACT

A speech conversation is changed to a text transcript, which is then pre-processed and subjected to text mining to determine salient terms. Salient terms are those terms that meet a predetermined level of selectivity in a collection. The text transcript of the speech conversation is displayed by emphasizing the salient terms and minimizing non-salient terms. An interface is provided that allows a user to select a salient term, whereupon the speech conversation is played beginning at the location, in the speech file, of the selected salient term.

31 Claims, 8 Drawing Sheets

| Table of Terms | |
|---|---|
| 405 — Single_Word_Term | IQ — 435 |
| 410 — Multiword Term | IQ — 440 |
| 415 — Multiword Term | IQ — 445 |
| 420 — Single_Word_Term | IQ — 450 |
| 425 — Multiword Term | IQ — 455 |
| ⋮ | |
| 430 — Multiword Term | IQ — 460 |

SYSTEM AND METHOD FOR SEARCHING, ANALYZING AND DISPLAYING TEXT TRANSCRIPTS OF SPEECH AFTER IMPERFECT SPEECH RECOGNITION

FIELD OF THE INVENTION

The present invention relates to digital libraries of transcribed speech documents and, more particularly, relates to searching, analyzing and displaying text transcripts of speech after imperfect speech recognition.

BACKGROUND OF THE INVENTION

Regardless of the search technology being used, most search systems follow the same basic procedure for indexing and searching a database in a digital library. First, the data to be searched must be input to the search system for indexing. Next, attributes or contents or both are extracted from the objects and processed to create an index. An index consists of data that is used by the search system to process queries and identify relevant objects. After the index is built, queries may be submitted to the search system. The query represents information needed by the user and is expressed using a query language and syntax defined by the search system. The search system processes the query using the index data for the database and a suitable similarity ranking algorithm. From this, the system returns a list of topically relevant objects, often referred to as a "hit-list." The user may then select relevant objects from the hit-list for viewing and processing.

A user may also use objects on the hit-list as navigational starting points. Navigation is the process of moving from one hypermedia object to another hypermedia object by traversing a hyperlink pointer between the objects. This operation is typically facilitated by a user interface that displays hypermedia objects, highlights the hyperlinks in those objects, and provides a simple mechanism for traversing a hyperlink and displaying the referent object. One such user interface is a Web browser. By navigating one object to another, a user may find other objects of interest.

In a network environment, the components of a text search system may be spread across multiple computers. A network environment consists of two or more computers connected by a local or wide area network, (e.g., Ethernet, Token Ring, the telephone network, and the Internet). A user accesses the hypermedia object database using a client application on his or her computer. The client application communicates with a search server (e.g., a hypermedia object database search system) on either the computer (e.g., the client) or another computer (e.g., one or more servers) on the network. To process queries, the search server needs to access just the database index, which may be located on the same computer as the search server or yet another computer on the network. The actual objects in the database may be located on any computer on the network. These systems are all well known.

A Web environment, such as the World Wide Web on the Internet, is a network environment where Web servers and browsers are used. Having gathered and indexed all of the documents available in the collection, the index can then be used, as described above, to search for documents in the collection. Again, the index may be located independently of the objects, the client, and even the search server. A hit-list, generated as the result of searching the index, will typically identify the locations and titles of the relevant documents in the collection, and the user will retrieve those documents directly with his or her Web browser.

While these types of search systems are suitable for most types of documents, one area in which these systems breakdown is in the area of automatic speech recognition as it is applied to speech on which the system has not been trained. Automatic speech recognition of conversations, such as telephone calls, general discussions and meetings, is an extremely difficult problem when a speech recognition system cannot be trained in advance for each specific speaker. For such spoken documents, the recognition accuracy may be as low as 30 percent.

The text transcription of the speech documents for untrained speech can be searched with the use of a search system, but the low recognition accuracy can present problems. For example, a display of such a text document to the end user can be extremely confusing since the text can appear to be nonsensical. This also provides incorrect search results, as many of the returned results will meet the search criteria but actually be incorrect translations of a speech document. Thus, the returned text of the speech document will be returned as relevant when in fact it may not be relevant.

This is particularly true when the speech documents are recorded conversations of, for instance, the marketing phone calls of a financial telemarketing company. In this case, not only must the speech recognition be speaker-independent, but it must also deal with a wide variety of accents for both the marketing people and the customers, and with significantly reduced audio quality. In this case, the callers and the customers may have a wide variety of difficult regional accents, in addition to any number of foreign accents.

Finally, and most significant, telephone conversation is informal speech, consisting of phrases, fragments, interruptions and slang expressions not normally found in formal writing. Thus, the predictive model that speech recognition engines use to recognize which words are likely to come next is much more likely to fail.

Speech recognition systems are built on two models: a language model and an acoustic model. The acoustic model for telephone transcription can help mitigate the reduced frequency spread in the resulting recording. The language model is built on some millions of words found in general writing. It can be enhanced by including domain terms for the area being discussed, which in this example is for the financial industry. However, even with this additional enhancement, the quality of speech recognition is at best 50 percent of the words in telephone conversations, and in problematic cases significantly worse. Displaying and querying this type of erroneous information is problematic.

Thus, what is needed is a technique to overcome the poor transcription and subsequent display of the text of a speech document when imperfect speech recognition has been used to transcribe the document.

SUMMARY OF THE INVENTION

The present invention provides techniques to search, analyze and display text transcripts of speech after imperfect speech recognition. Broadly, a speech conversation is changed to text, which is then pre-processed and subjected to text mining to determine salient terms. Salient terms are those terms that meet a predetermined level of selectivity in a collection. The text of the speech conversation is displayed by emphasizing the salient terms and minimizing non-salient terms. An interface is provided that allows a user to select a salient term, whereupon the speech conversation is played beginning at the location, in the speech file, of the selected salient term.

A more complete understanding of the present invention, as well as further features and advantages of the present invention, will be obtained by reference to the following detailed description and drawings.

BRIEF DESCRIPTION OF THE DRAWINGS

FIG. 4 is an example table from a table of terms database in accordance with one embodiment of the present invention;

DETAILED DESCRIPTION OF PREFERRED EMBODIMENTS

The present invention allows text documents that contain a large number of speech recognition errors to be viewed and searched in a way that minimizes the errors and maximizes the amount of relevant information in the document. Generally, these documents will be "speech-recognized," which means that the text has been created by a speech recognition system. The speech will usually come from a source having multiple speakers where the speech recognition system is not trained on each speaker.

The present invention takes text transcripts of speech, which are created from imperfect speech recognition, and processes them to determine salient terms. The salient terms are those terms that meet a predetermined selectivity. The salient terms are displayed to a user by maximizing the salient terms relative to the non-salient terms. This allows the relative location, in a conversation, of the salient terms to be displayed, but minimizes the non-salient terms, which are likely to be erroneous.

It should be noted that the examples given below assume that telephone calls are the conversations on which the present invention is run. However, the present invention may be used on any text that is imperfectly transcribed by a speech recognition system. In fact, the present invention may be used on any text, although the present invention will usually be applied to text transcripts that contain high amounts of errors due to imperfect speech recognition.

Figure 1:
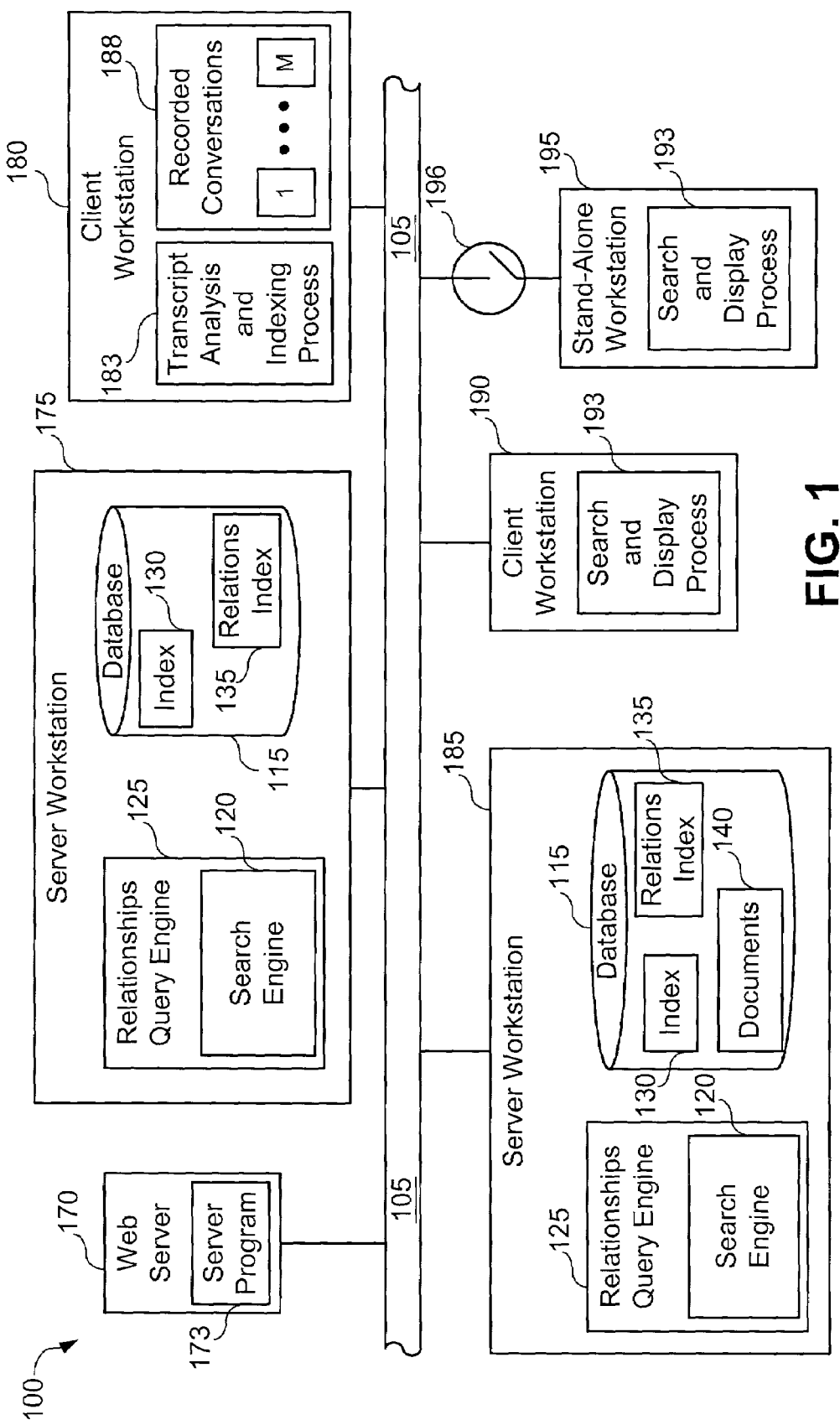
FIG. 1 is a block diagram of a typical networked search system in accordance with one embodiment of the present invention.

FIG. 1 illustrates a typical networked search system 100 that may be used when searching, analyzing and displaying text transcripts of speech after imperfect speech recognition. System 100 comprises a Web server 170, a server workstation 175, a client workstation 180, a server workstation 185, a client workstation 190, and a stand-alone workstation 195, all interconnected through network 105. Web server 170 comprises server program 173. Server workstation 175 comprises a relationships query engine 125 and a database 115. Relationships query engine 125 comprises modified search engine 120. Database 115 comprises index 130 and relations index 135. Client workstation 180 comprises transcript analysis and indexing process 183 and recorded conversations 188, which has conversations 1 through M. Workstation 185 is similar to workstation 175. Workstation 185 comprises a relationships query engine 125 and a database 115. Relationships query engine 125 comprises modified search engine 120. Database 115 comprises index 130, relations index 135 and documents 140. Client workstation 190 and stand-alone workstation 195 comprise search and display processes 193.

The network 105 may be a local area network (LAN), a wide area network (WAN), the Internet or a combination of the foregoing. Moreover, some of the computers in this environment may support the Web information exchange protocol (e.g., HyperText Transmission Protocol or HTTP) and be part of a local Web or the World Wide Web (WWW). Some computers may be occasionally connected to the network and operate as stand-alone computers. For example, stand-alone workstation 195 connects to network 105 through an intermittent connection 196, which is, for instance, a Digital Subscriber Line (DSL) or dial-up modem.

The example of FIG. 1 shows two separate tools that comprise a large part of the present invention. These tools are the transcript analysis and indexing process 183 and the search and display process 193. In upcoming figures, these tools will be considered to be unified. However, they are split here as an aid to understanding the invention and they may be implemented separately.

Generally, transcript analysis and indexing process 183 converts the M recorded conversations 188 to M raw speech transcripts using a speech recognition system. The raw speech transcripts and speech recognition system are not shown in FIG. 1 but are described in more detail below. The raw speech transcripts are processed by the transcript analysis and indexing process 183, using additional tools, not shown in FIG. 1 but described below, to determine salient terms in each recorded conversation of recorded conversations 188. A salient term is a single word or multiword term that meets a predetermined selectivity. Briefly, transcript analysis and indexing process 183 uses a tool to select high selectivity single word and multiword terms from processed text documents. From these high selectivity terms, an additional level of scrutiny is performed to select the salient terms.

Once the salient terms are determined, the transcript analysis and indexing process 183 creates the relations index 135 from the salient terms and index 130 from the documents. Relations index 135 represents the relationships between terms in the salient terms, while index 130 represents the relationships between documents. In one embodiment, the system 100 has a workstation 185 containing a collection of documents 140 and corresponding indexes 130, 135. In another embodiment, the system 100 has a workstation 175 containing only the indexes 130 and 135 to these documents 140. Documents 140 will generally contain recorded conversations 188 and additional information, described below in reference to FIG. 2, to be able to display the salient terms and the text of a conversation and to playback the conversation.

Both embodiments utilize a search engine 120 to search these indices. A user can use the search and display process 193 and enter query search terms. In one embodiment, the system 100 also has a Web server computer 170 which provides a way of viewing the documents 140, links between them, query search terms, and results. The search and display process 193 communicates with server program 173, which sends requests to relationships query engine 125 and search engine 120.

A user can use search and display process 193 to search, by entering query terms, for relevant conversations in recorded conversations 188. The user can select an appropriate conversation for display. The search and display process 193 then displays text of the recorded conversation by emphasizing display of the salient terms relative to the non-salient terms. This is described in more detail below.

Even though unprocessed text transcripts of recorded conversations 188 may be almost unreadable, system 100 allows relevant information to be extracted from the conversations 188 and displayed in a manner that highlights the relevant information.

Figure 2:
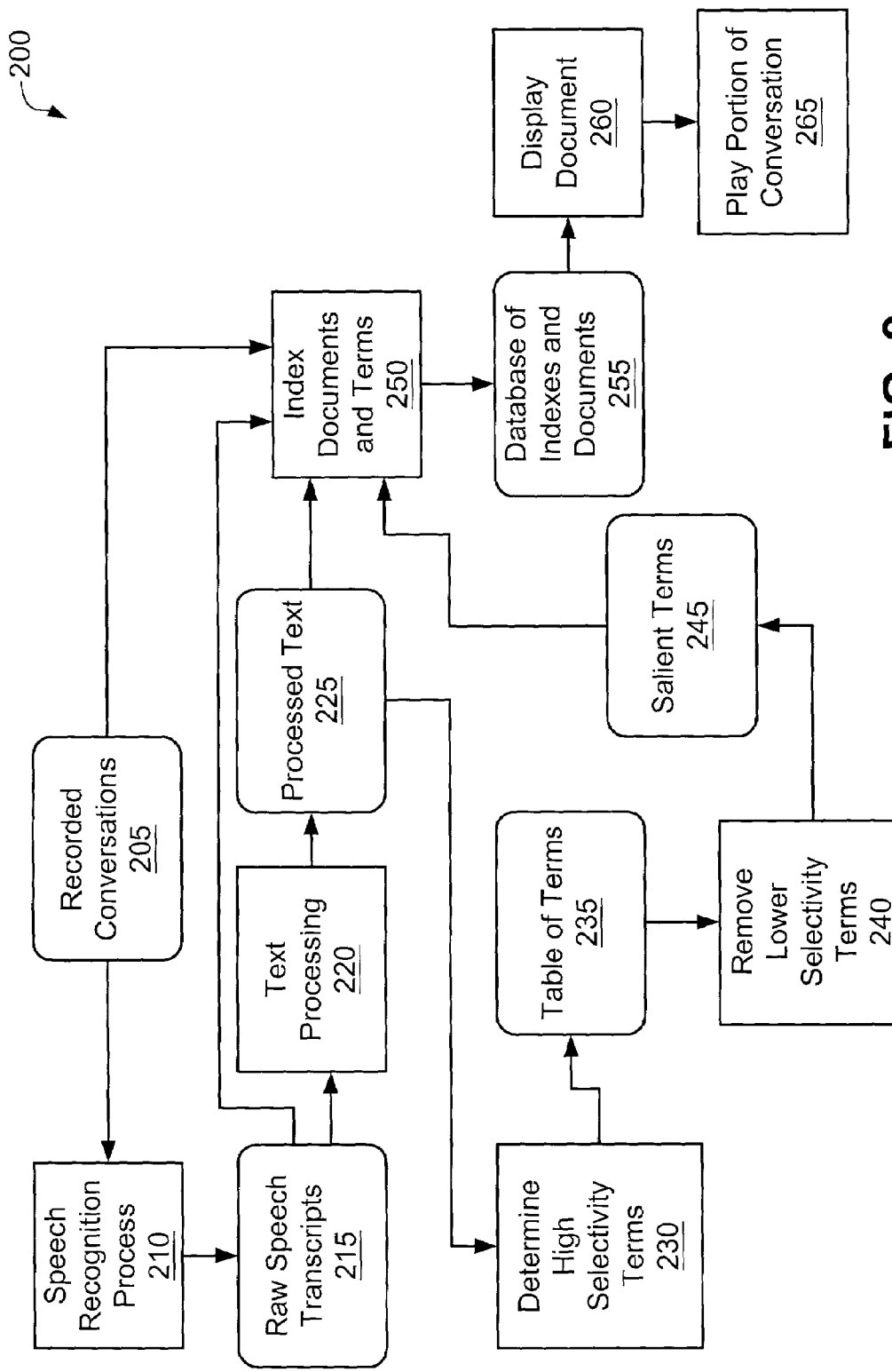
FIG. 2 is a flow chart of an exemplary method for searching, analyzing and displaying text transcripts of speech after imperfect speech recognition in accordance with one embodiment of the present invention.

FIG. 2 shows a flowchart of a method 200 for searching, analyzing and displaying text transcripts of speech after imperfect speech recognition, in accordance with one embodiment of the present invention. This method is used whenever recorded conversations are to be displayed. Method 200 is shown in a format that indicates the information at particular points in the method and the method steps that operate on the information. For example, reference 205 represents recorded conversations, while reference 210 represents a method step performed on the recorded conversations 205 to produce the raw speech transcripts 215. This format should make method 200 easier to follow.

Method 200 begins after a number of conversations 205 have been recorded, such as might be accumulated by a telemarketing operation, by a help or service center, or through any spoken speech where a speech recognition system is untrained for one or more of the speakers. Each of the recorded conversations 205 is recognized by a speech recognition system 210, such as the IBM ViaVoice system. The vocabulary in the system may be enhanced by using terms associated with the conversations. For example, for telemarketing calls from a financial vendor, terms suitable for the financial industry, such as "index bond fund," "mutual fund" and "international fund," may be added to the vocabulary. Similarly, for a help center that helps people with computer problems, terms such as "modem," "Internet" and "icon" could be added to the vocabulary. The result is a series of raw speech transcripts 215 of each conversation.

The raw speech transcripts 215 are then subjected to text processing 220. Text processing 220 pre-processes the raw speech transcripts 215 to create processed text 225. The pre-processing, for example, increases sentence and paragraph structure, removes non-word utterances, and replaces low selectivity words and phrases. Step 220 is further discussed below in reference to step 230 and also in reference to FIG. 3. These processed text 225 are then sent to both the call display step 250 and step 230. In step 230, the high selectivity terms are determined.

High selectivity terms are single word and multiword terms that meet a particular selectivity level. An exemplary tool that may be used to determine high selectivity terms is the Textract software tool. Other text mining tools may be used. A version of Textract is incorporated in the IBM Intelligent Miner for Text product. Textract is a chain of tools for recognizing multiword terms and proper names. Textract is a text mining tool, which means that it finds single and multiword terms and ranks them by salience within the document collection. The tool also discovers relationships between terms based on proximity. Textract reduces related forms of a term to a single canonical form that it can then use in computing term occurrence statistics more accurately. In addition, it recognizes abbreviations and finds the canonical forms of the words they stand for and aggregates these terms into a vocabulary for the entire collection, and for each document, keeping both document and collection-level statistics on these terms.

Each term is given a collection-level importance ranking, called the IQ or Information Quotient. The IQ is discussed in Cooper et al., "OBIWAN—'A Visual Interface for Prompted Query Refinement,'" Proceedings of the 31 st Hawaii International Conference on System Sciences (HICSS-31), Kona, HI, 1998; and Prager, "Linguini: Recognition of Language in Digital Documents," Proceedings of the HICSS-32, Wailea, HI, 1999, the disclosures of which are incorporated herein by reference. The IQ is a measure of the collection selectivity of a particular term: a term that appears in "clumps" in only a few documents is highly selective and has a high IQ. On the other hand, a term that is evenly distributed through many documents is far less selective and has a low IQ. IQ is measured on a scale of 0 to 100, where a value of X means that X percent of the vocabulary items in the collection have a lower IQ. Two of the major outputs of Textract are the IQ and collection statistics for each of these canonical terms, and tables of the terms found in each document. These are output as table of terms 235, which is shown and discussed in more detail reference to FIG. 4.

As previously discussed, the raw speech transcripts 215 are pre-processed in step 220. The pre-processing occurs before submitting transcripts to the Textract text mining and search engine indexing processes. Text mining assumes well-edited text, such as news articles or technical reports, rather than informal conversation, inaccurately recorded. The pre-processing performed in step 220 on raw speech transcripts 215 meets the requirements, by Textract, of well-edited text in sentences and paragraphs. Textract uses these boundaries to decide whether it can form a multiword term between adjacent word tokens and how high the level of mutual information should be in determining co-occurring terms.

One output of the text mining performed by Textract is a table (not shown in FIG. 2) of single-word and multiword terms found in each document. Each term meets a predetermined high selectivity. These single-word and multiword terms are added to the table of terms 235.

Textract also has additional outputs, such as collection statistics for each of the canonical terms and tables of discovered named and unnamed relations. Unnamed relations are strong bi-directional relations between terms which not only co-occur but occur together frequently in the collection. These terms are recognized from the document and term statistics gathered by Textract and by the relative locations of the terms in the document. Textract assigns terms to categories such as Person, Place, Organization, and Unknown Term. Single word and multiword terms found by Textract and assigned to the categories Unknown Name (Uname) and Unknown Word (Uword) are excluded from table of terms 235, but other terms found by Textract are added to table of terms 235.

Figure 5:
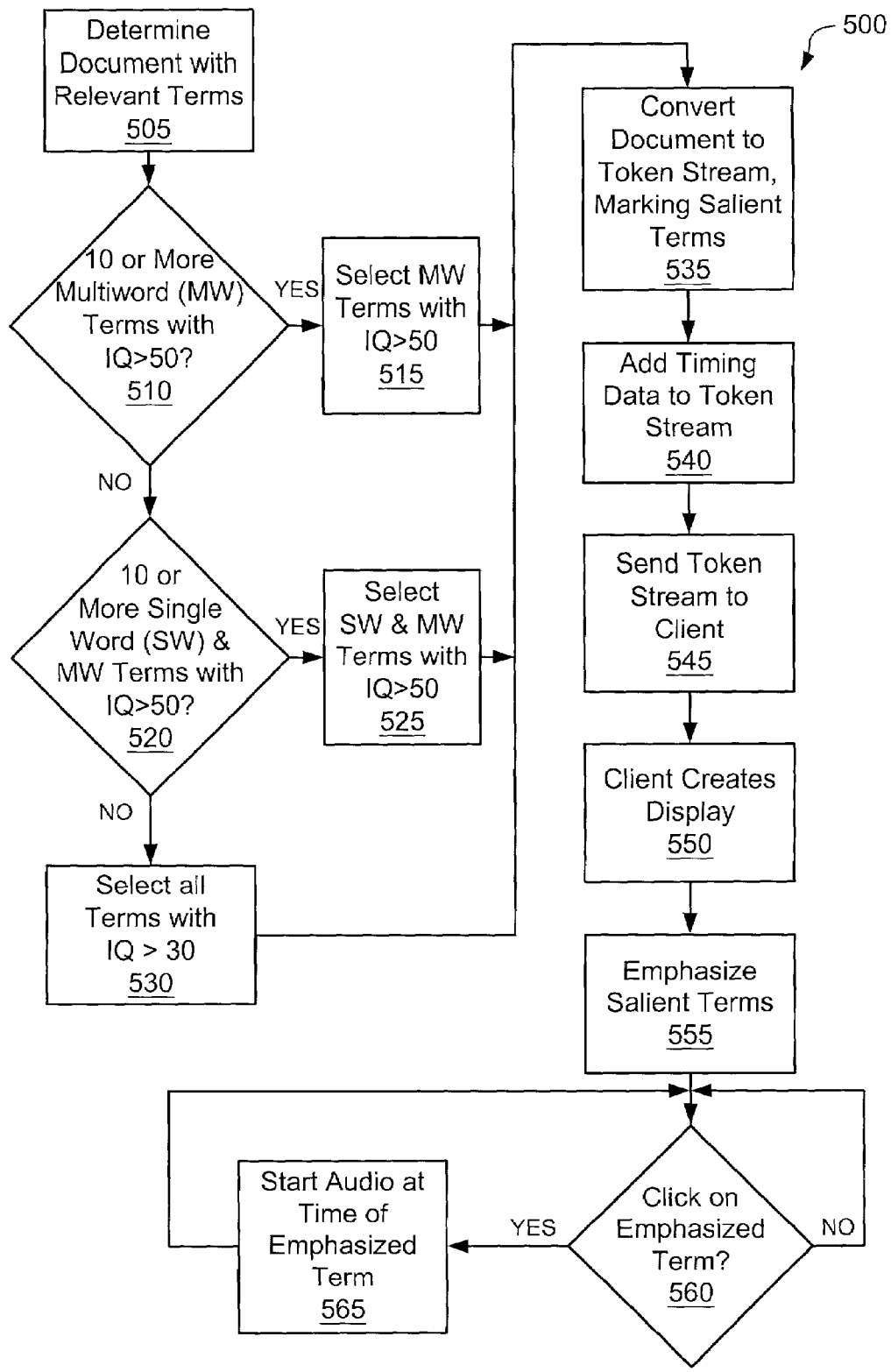
FIG. 5 is a method for determining and displaying salient terms in accordance with one embodiment of the present invention.

To account for the low accuracy of speech recognition, the table of terms 235 is further reduced in step 240 by removing single-word terms, those whose category is uncertain (Uword and UName), and those of low selectivity. This occurs in step 240. Single-word removal in step 240 is additionally explained below in more detail in reference to FIG. 5. Low selectivity terms are those terms that appear so frequently in a collection that they are not significant. The IQ, described above, is used as a metric to determine whether terms have low selectivity. Low selectivity terms depend on the collection. For instance, "invest" may be a low selectivity word in speech transcripts of personnel who are selling financial services. Once the lower selectivity terms are removed, the remaining single word and multi-word terms are the salient terms 245. It should be noted that it is not necessary to perform step 240 at this stage. Instead, table of terms 235 may be indexed in a database as discussed in reference to step 250, and step 240 may be determined when the documents are retrieved from the database. FIG. 5, discussed below, assumes that parts of step 240 are performed when the documents are retrieved from the database.

The recorded conversations 205, raw speech transcripts 215, processed text 225, and salient terms 245 are indexed into a database. This happens in step 250, which creates a database 255 of indexed terms and documents. Recorded conversations 205 are used to play a speech document whenever a user requests the document. Raw speech transcripts 215 are used to provide timing information. Processed text 225 are used to display the text of the conversation, but the display is created to emphasize the salient terms 245 relative to the non-salient terms. This is described in more detail in reference to FIG. 7, but, generally, the salient terms are highlighted while the non-salient terms are either much smaller than the salient terms or are made unreadable. Thus, the relevant information, which is the information that has been determined to have a very high selectivity, in a conversation is shown while the non-relevant information is minimized or not shown.

Once the documents have been indexed and stored in a search index and a database, a document can be retrieved and displayed. A display (step 260) of a document allows a user to select a salient term and to play a portion of a conversation (step 265) from the time of the salient term until the end of the conversation or until the user stops the playback. Timing information in raw speech transcripts 215 is used to determine when a salient term occurs, relative to the start of the conversation. The text for the document in processed text 225 is used, along with a screen location, to determine which salient term has been selected by the user.

Thus, method 200 provides a technique for analyzing transcripts of conversations and emphasizing salient terms in the conversations.

Figure 3:
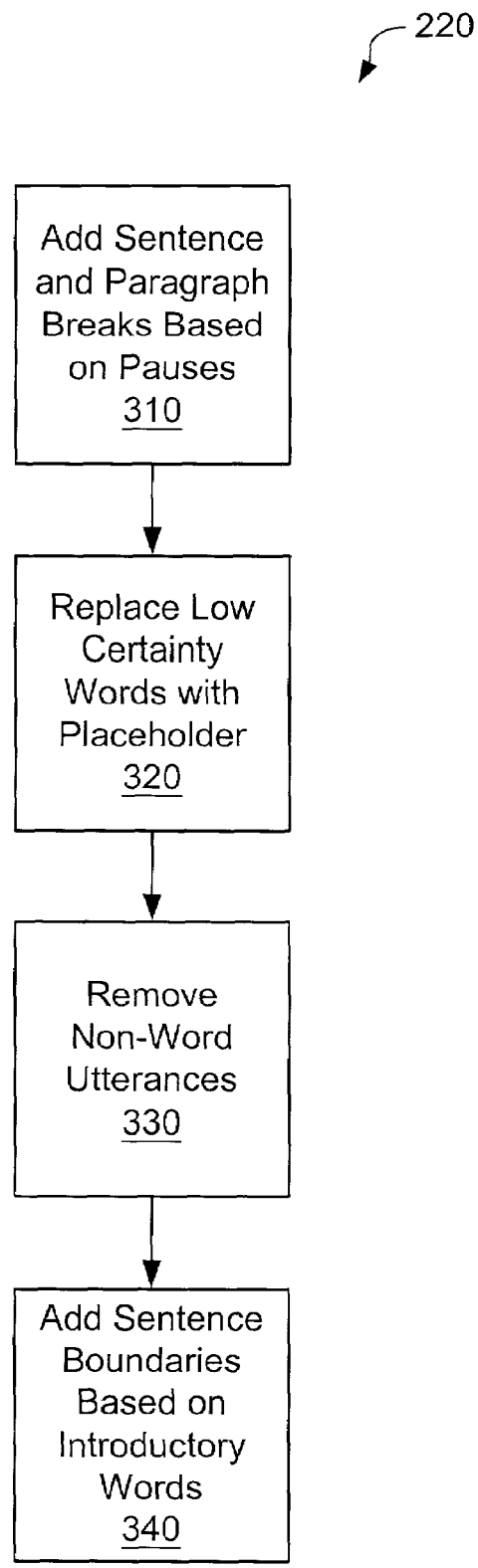
FIG. 3 is a flow chart of an exemplary method for processing text documents in accordance with one embodiment of the present invention.

Referring now to FIG. 3, a method 220 for processing text is shown. Method 220 accepts raw speech transcripts 215 as input and method 220 produces processed text.

Much of the post processing analysis performed by method 220 on call transcripts is driven by the requirements of well-edited text in sentences and paragraphs. As previously indicated, text mining assumes well-edited text, such as news articles or technical reports, rather than informal conversation, inaccurately transcribed. A text mining program uses these boundaries to decide whether it can form a multiword term between adjacent word tokens and how high the level of mutual information should be in determining co-occurring terms.

Timing information in the raw speech transcripts is used, in step 310, to insert periods and paragraph breaks in the text stream. While speech recognition engines provide estimates of these points, it is possible to fine-tune these estimates by applying empirically derived parameters. The parameters given below are merely exemplary; other parameters may be used. In step 310, in one embodiment, pauses of between 0.80 seconds and 1.19 seconds are replaced with a sentence break. Specifically, a period and two blanks are added and the following word is capitalized.

In step 310, in one embodiment, pauses of 1.2 seconds or more are replaced with a new paragraph, by adding a period, two blank lines and a capital letter to the next word. Paragraph boundaries are important in this analysis because speaker separation information is not always available in certain versions of voice recognition engine, and, in mining text for related terms, paragraph boundaries provide a break between sentences that reduces the strength of the computed relationships between terms.

Some speech engines provide silence information as a series of "silence tokens," where each token was assigned a duration. Frequently, there would be several sequential silence tokens, presumably separated by non-speech sounds. When this occurred, the silence tokens are summed to a single token that is used to determine whether to insert punctuation.

Speech engines provide estimates of the certainty that it has recognized a word correctly. This certainty is generally referred to as "confidence." The confidence figures are useful in the present invention in a significant way. If the speech engine indicates that a word was recognized with low confidence, eliminating the word provides a more useful transcript. This is important because some speech engines tend to insert proper nouns for words they recognize with low confidence and these nouns are frequently incorrect. When a text-mining system is run on such text, these proper nouns are recognized as salient when they in fact should not have been found at all.

It is possible to remove these low confidence terms from the transcripts entirely, but this leads to the text-mining system forming multiword systems across these boundaries when it should not be able to do so. Instead, it is preferred that each occurrence of a low confidence term be replaced with a placeholder. This occurs in step 420. A suitable placeholder is the letter "z." These non-word placeholders prevent the formation of spurious multiwords without significantly reducing the clarity of the recognized speech.

Some speech engines also produce tokens for non-word utterances, such as "uh," "um" and <smack>, which are removed entirely in step 330. Removing these is usually necessary, since they often interfere with the formation of multiword terms. Thus, "bond <uh>funds" is reduced to "bond funds" in step 330.

In addition to the analysis of the raw speech transcripts provided by a speech engine, there are some English language cues that may be used to improve the recognition of sentence boundaries. This occurs in step 340. There are a number of common English words and phrases that are used exclusively or primarily to start sentences, such as "Yes," "OK," "Well," "Incidentally," "Finally," and so forth. These introductory words and phrases are tabulated (not shown in the figures) and used to further process the raw speech transcripts. Whenever introductory words or phrases are found, a period and two spaces are inserted and the introductory word or first word of an introductory phrase is capitalized.

Once step 320 has been performed to create processed text 225, the text transcripts that result are still confusing. However, there is still value in these transcripts. The nature of the conversation can be outlined, even without accurate speech recognition. Method 220 helps in this regard by providing formatted text to text mining tools so that salient terms can be determined from raw speech transcripts that are almost gibberish.

Turning now to FIG. 4, an exemplary table of terms 235 is shown. Table of terms 235 is created by step 230 (see FIG. 2), which will generally be performed by a text mining tool such as Textract. Table of terms 235 comprises terms 405, 410, 415, 420, 425, and 430, and Information Quotients (IQs) 435, 440, 445, 450, 455, and 460. The IQ has previously been discussed. Each term 405 through 430 will be a single word or multiword term. Each IQ corresponds to one of the terms and indicates the selectivity of the term. The higher the IQ, the more likely it is that the term is relevant in the context of the text document.

Figure 6:
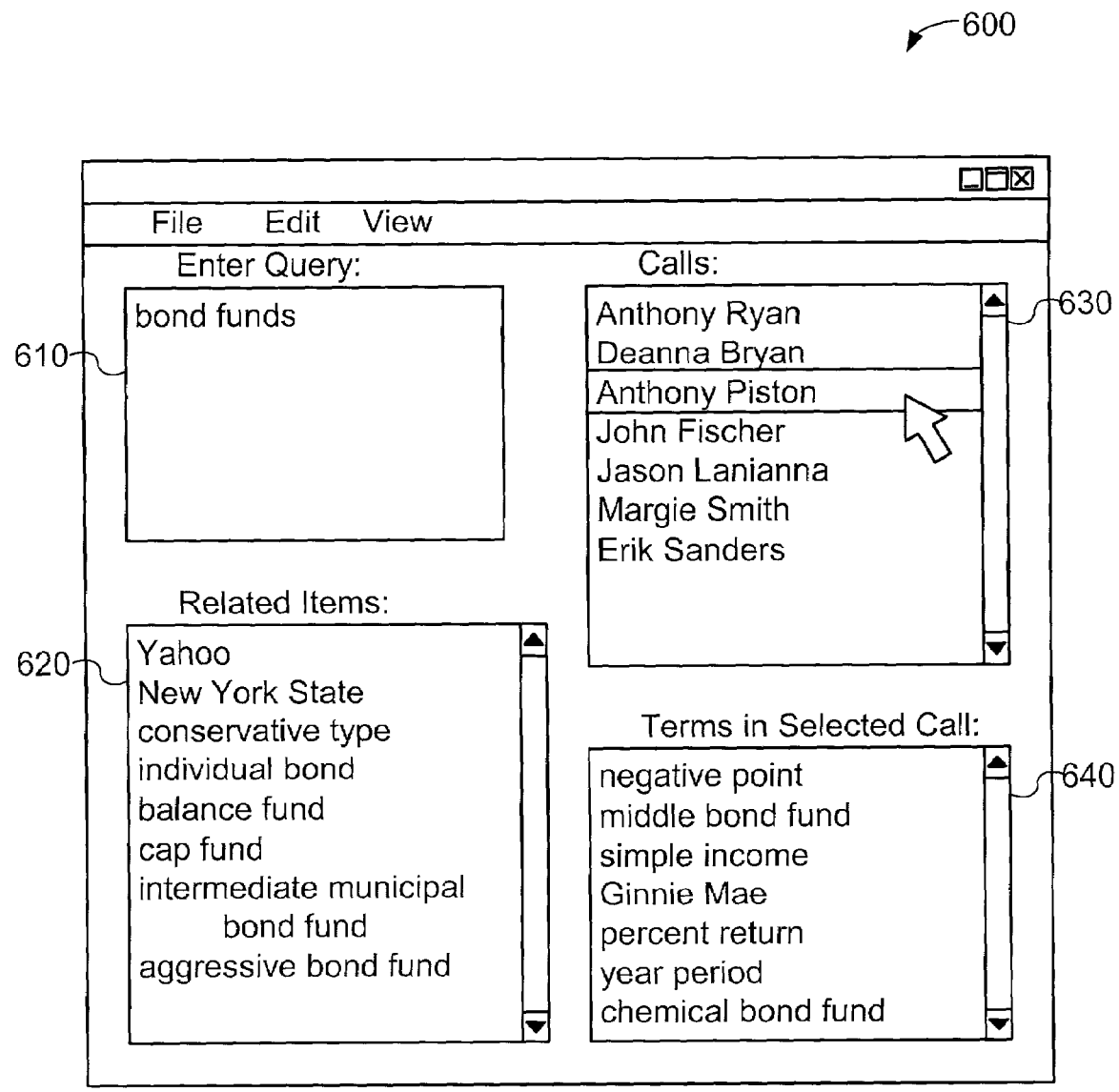
FIG. 6 shows a search screen in accordance with one embodiment of the present invention.

As shown in FIG. 2, the table of terms 235 are processed even more to determine salient terms. An example of a displayed document showing salient terms is discussed in reference to FIG. 7. The salient terms and additional information are indexed and placed into a database. A user can then search the database for recorded conversations that contain particular terms and cause one or more documents to be displayed. An exemplary interface for searching for query terms is shown in FIG. 6. Alternatively, the table of terms may be indexed and stored in a database. Upon retrieval from the database, salient terms will be determined from the table of terms 235.

Referring now to FIG. 5 with appropriate reference to FIG. 2, FIG. 5 shows a flowchart of a method 500 for searching, retrieving, and displaying documents containing salient terms. Method 500 is run whenever a user wishes to search through a database of documents in order to find documents containing query terms and to display one or more documents having the query terms.

Method 500 begins when documents containing user entered query terms are determined and retrieved. This occurs in step 505. Each document corresponds to a recorded conversation. Searching for documents containing specific terms is well known in the art. Additionally, in step 505, a user will select a document for display. Often, there will be multiple documents that contain search terms, and a user selects one of these returned documents to display. Once a document has been retrieved and selected by a user for display, method 500 will perform additional processing on the table of terms, found in the database, for the selected document. In the example of FIG. 5, the database contains recorded conversations 205, raw speech transcripts 215, processed text 225 and tables of terms 235 (see FIG. 2). Method 500 performs additional processing on table of terms 235 to extract a sufficient number of salient terms 245 from the table of terms 235. Steps 510, 515, 520, 525, and 530 perform some of the functions of method step 240 of FIG. 2. If desired, method 500 may perform additional functions of method step 240, which have already been described. The number of terms sufficient for a given application may vary. Typically 10 or more could be considered sufficient and are used in the discussion below.

In step 510, it is determined if there are 10 or more multiword terms with an IQ $\geq 50$ in the table of terms 235. If so (step 510 equals YES), then all of the multiword terms with IQ $\geq 50$ are selected (step 515) and sent to step 535. If step 510 equals NO, then, in step 520, it is determined if there are 10 or more single word and multiword terms with IQ $\geq 50$. If so (step 520 equals YES), then the single word and multiword terms are selected (step 525) and sent to step 535. If not (step 520 equals NO), then all terms with IQ $\geq 30$ are selected (step 530).

Essentially, steps 510 through 530 ensure that the terms with the highest selectivity are selected for display. Multiword terms are selected preferentially because they usually contain more information.

Step 535 converts the selected document, which is a transcription of a recorded conversation 205, to a token stream suitable for display. The salient terms are marked as such. Timing data for each salient term is added to the token stream. The raw speech transcripts 215 contain timing information for each word. The timing information is used to associate a time with each salient term. If there are multiple instances of the same salient term in a document, each instance will be associated with a different time from the raw speech transcripts 215.

In step 545, the token stream is sent to a client, which is the workstation or computer system being used by the user who has sent the query request. More specifically, an interface program on the client workstation will accept queries from a user, send the queries to a search engine that searches the database and receive the information from the search engine. As shown in FIG. 1, the interface program could be written to transmit query requests to a Web server that would then process the requests and send and receive information from the search engine. The Web server then either communicates with the interface program, sending the information to the interface program, or creates a new output web page on the server which it returns to the client.

In step 550, the client displays the result. An exemplary display is discussed in more detail in reference to FIG. 7. The client creates the display so that the display emphasizes the salient terms (step 555). If there is no "click" (step 560 equals NO), which is a selection action by a selection device such as a mouse or trackball, the method continues to wait. When there is a selection of an emphasized term (step 560 equals YES), the method begins playing the recorded conversation at approximately the point where the emphasized term occurs (step 565).

It should be noted that the criteria in steps 510, 520 and 530 may be changed to suit particular recordings or occupational areas. For example, consistently poor telephone connections will decrease the recognition accuracy of a recorded conversation. Additionally, certain occupations contain terminology that is harder for a speech recognition system to recognize. While modifying the vocabulary of a speech recognition system, with specific terminology from a particular occupation, helps this situation, it does not completely eliminate it. Thus, the criteria may be changed for particular situations.

Referring now to FIG. 6 with appropriate reference to FIG. 1, FIG. 6 shows a search screen 600. Search screen 600 has a query area 610, a related items area 620, a call box 630, and a terms box 640. A user enters query terms in query area 610, and these terms are sent to a search engine (see FIG. 1). In the example of FIG. 6, the query is "bond funds." The search engine searches the index 130 and the relations index 135 (see FIG. 1), The telephone calls that contain these search terms are returned in call box 630, while related terms are returned in related items box 620. Related terms can be computed using proximity measures of terms within the collection. The most salient terms found in the selected call are placed into terms box 640.

Search screen 600 allows a user to select a call. In the example of FIG. 6, a call by Anthony Piston is selected. Salient terms found in the call are placed in terms box 840. With this system, a user can find conversations that contain certain search terms and determine whether the call should be played. The user can play the recording by, for instance, double clicking on a document in the list box 630 or selecting a "show" button (not shown) under the View menu.

Figure 7:
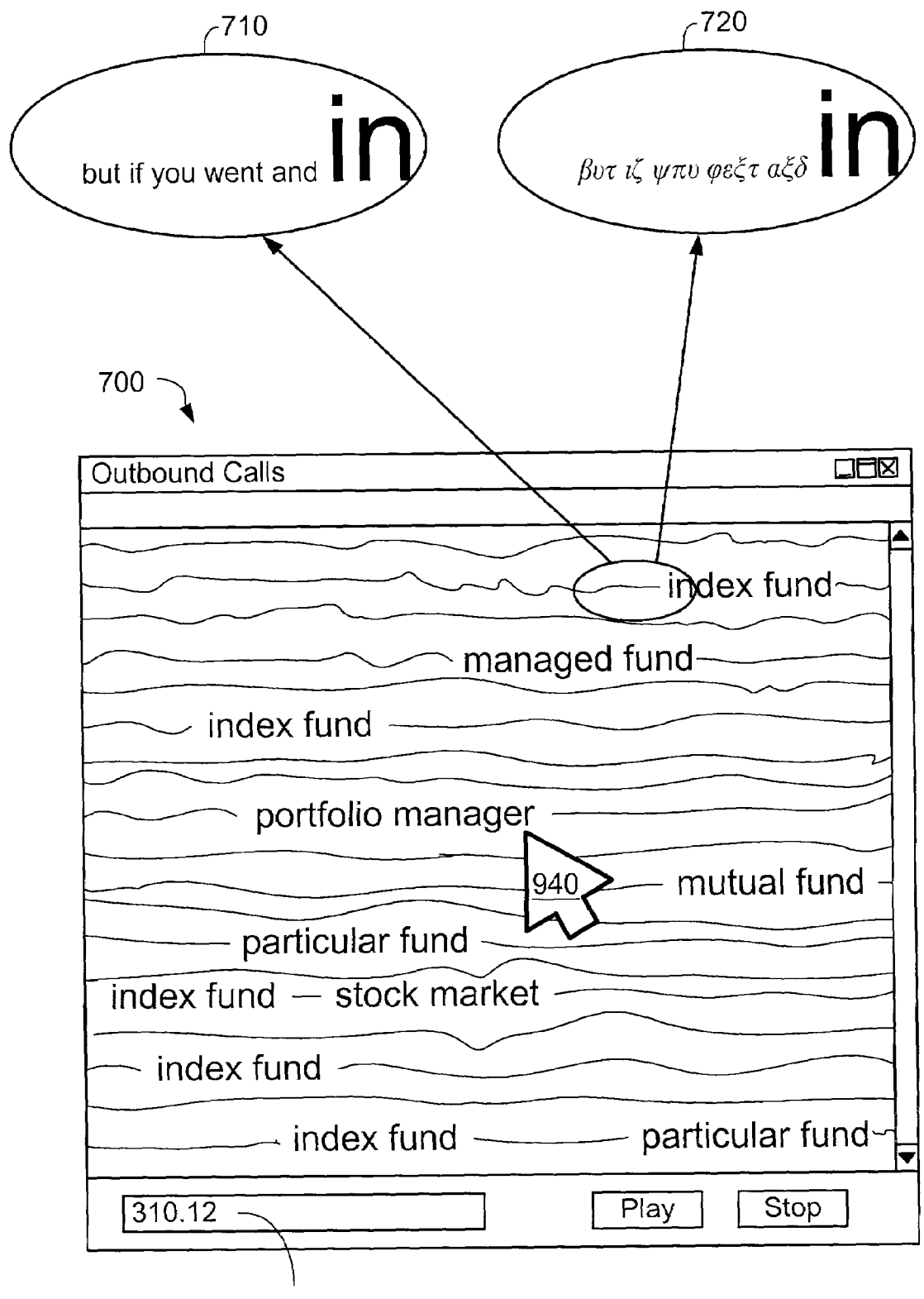
FIG. 7 shows a document display screen in accordance with one embodiment of the present invention.
Figure 8:
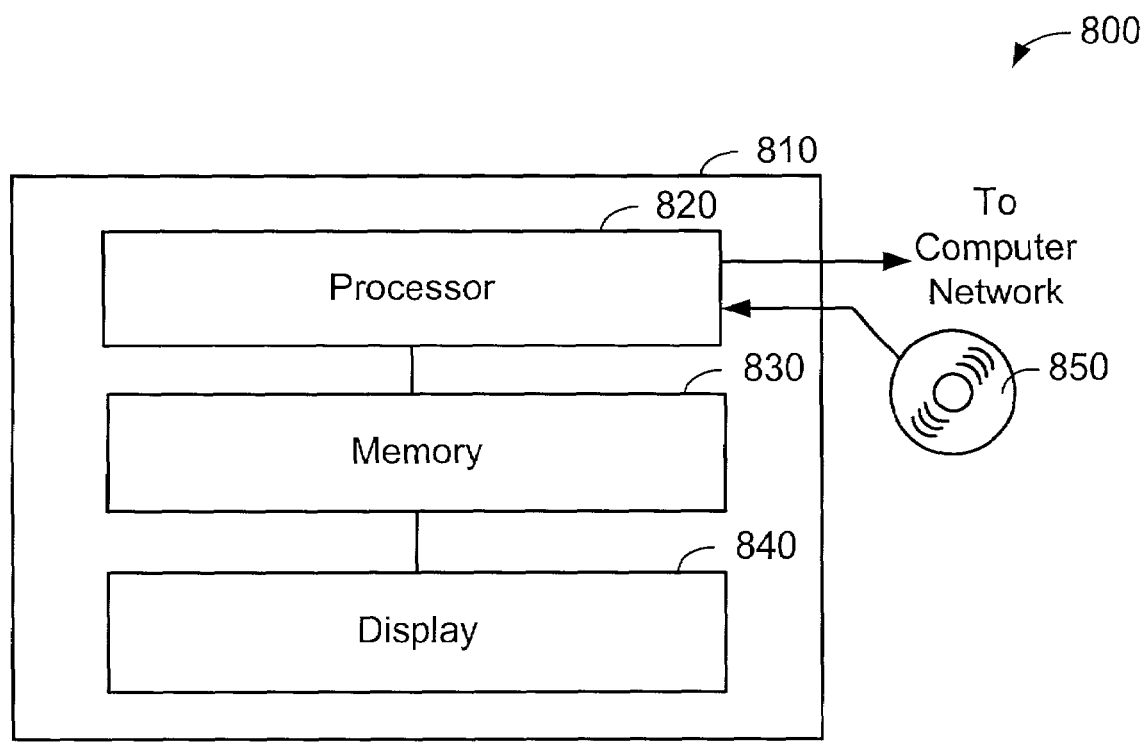
FIG. 8 shows a system, in accordance with one embodiment of the present invention, suitable for carrying out the present invention.

If a user selects a conversation to view, a display such as that shown in FIG. 7 results. FIG. 7 shows an exemplary display screen 700 that emphasizes salient terms relative to non-salient terms. Even though salient terms have been determined from a text document with a relatively high selectivity, the rest of the text document, which is a transcription of the conversation, has very low selectivity and many recognition errors. This has already been shown in relation to the text transcript quoted and discussed above. A user who reads the text transcript could be misled as to the contents of the conversation. Consequently, the transcript display emphasizes the salient terms relative to the non-salient terms.

There are a number of ways to emphasize the salient terms relative to the non-salient terms. Three different techniques are shown in FIG. 7. One technique is to make the non-salient terms completely unreadable. This is shown in display screen 700. Another technique is shown in location 710, where the font size of the non-salient terms is much smaller than the font size of the non-salient terms. For example, the non-salient terms could be in a font size at least 10 points smaller than the font size of the salient terms. Location 720 shows another technique for emphasizing the salient terms. In this technique, the non-salient terms are placed in a non-text font, such as a symbol font. This has the benefit that the paragraph breaks, line changes, and other sentence elements are shown, but the non-salient terms cannot be read.

Display screen 700 also provides a "clickable" interface that allows a conversation to be played from a point where a salient term occurs. For instance, if a user directs cursor 740 within a predetermined distance from the salient term "portfolio manager," and clicks a mouse button, then the recorded conversation will be played from that time point in the recorded conversation. Time block 730 will indicate and track the time as the recorded conversation is played. The time shown in time block 730 will generally be an offset from the beginning of the conversation. However, time of day information may also be shown, if this information is available and desired.

Turning now to FIG. 9, a block diagram of a system 900 for searching, analyzing and displaying text transcripts of speech after imperfect speech recognition is shown. System 900 comprises a computer system 910 and a Compact Disk (CD) 950. Computer system 910 comprises a processor 920, a memory 930 and a video display 940.

As is known in the art, the methods and apparatus discussed herein may be distributed as an article of manufacture that itself comprises a computer-readable medium having computer-readable code means embodied thereon. The computer readable program code means is operable, in conjunction with a computer system such as computer system 910, to carry out all or some of the steps to perform the methods or create the apparatuses discussed herein. The computer-readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as compact disk 950.

Memory 930 configures the processor 920 to implement the methods, steps, and functions disclosed herein. The memory 930 could be distributed or local and the processor 920 could be distributed or singular. The memory 930 could be implemented as an electrical, magnetic or optical memory, or any combination of these or other types of storage devices. Moreover, the term "memory" should be construed broadly enough to encompass any information able to be read from or written to an address in the addressable space accessed by processor 910. With this definition, information on a network is still within memory 930 because the processor 920 can retrieve the information from the network. It should be noted that each distributed processor that makes up processor 920 generally contains its own addressable memory space. It should also be noted that some or all of computer system 910 can be incorporated into an application-specific or general-use integrated circuit.

Video display 940 is any type of video display suitable for interacting with a human user of system 900. Generally, video display 940 is a computer monitor or other similar video display.

Thus, the methods described here provide a unique approach to selective playback of speech-recognized audio files without having to have a completely accurate transcript. Since the highlighted terms are of high selectivity, one can play the call to understand the remainder of the call text without requiring accurate speech recognition. It also supplies a method of providing context to such speech data to assist analysts in studying the interactions (sales, marketing, help desks, etc.) that the calls represent.

It is to be understood that the embodiments and variations shown and described herein are merely illustrative of the principles of this invention and that various modifications may be implemented by those skilled in the art without departing from the scope and spirit of the invention.

What is claimed is:

1. A method for processing text transcripts of speech after imperfect speech recognition, the method comprising the steps of:

converting a speech document to text;

processing the text to determine salient terms; and displaying the text by emphasizing the salient terms and minimizing non-salient terms, wherein said salient terms are determined by:

determining high selectivity terms in the at least one text transcript;

determining how many high selectivity terms there are;

determining how many multiword and high selectivity terms there are that are above a first predetermined selectivity;

when there are ten or more high selectivity and multiword terms that have confidences greater than a first predetermined selectivity, displaying the ten or more high selectivity and multiword terms; and when there are less than ten high selectivity and multi-word terms that are above a first predetermined selectivity:

determining how many single word and high selectivity terms there are;

determining if there are ten or more single word and multiword terms that are high selectivity terms that have selectivities greater than a first predetermined selectivity;

when there are ten or more single word and multiword terms that are high selectivity terms that have selectivity greater than a first predetermined selectivity, displaying all of the ten or more single word and multiword terms; and when there are not ten or more single word and multiword terms that are high selectivity terms that have confidences greater than a first predetermined selectivity, displaying all single word and multiword terms that are high selectivity terms and that have confidences greater than a second predetermined selectivity.

2. The method of claim 1, wherein the step of processing the text to determine salient terms further comprises the steps of:

increasing sentence and paragraph structure in the text;
removing non-word utterances from the text;
determining high selectivity terms in the text; and
selecting terms from the high selectivity terms that are above a predetermined selectivity.

3. The method of claim 1, further comprising the steps of:
selecting a salient term;
determining a time of the salient term relative to a beginning time of the speech document; and
playing the speech document from the time of the salient term.

4. The method of claim 1, further comprising the step of creating the speech document by recording a conversation, and wherein the step of converting comprises performing speech recognition on the speech document, wherein any speakers of the speech have not trained the speech recognition system with their own speech.

5. A method for processing text transcripts of speech after imperfect speech recognition, the method comprising the steps of:

converting a speech document to at least one text transcript;
increasing sentence and paragraph structure in the at least one text transcript;
removing non-word utterances from the at least one text transcript;
determining salient terms in the at least one text transcript; and
displaying text of the at least one text transcript, the step of displaying performed to emphasize display of the salient terms relative to non-salient terms, wherein said salient terms are determined by:
determining high selectivity terms in the at least one text transcript:
determining how many high selectivity terms there are;
determining how many multiword and high selectivity terms there are that are above a first predetermined selectivity;
when there are ten or more high selectivity and multiword terms that have confidences greater than a first predetermined selectivity, displaying the ten or more high selectivity and multiword terms; and
when there are less than ten high selectivity and multiword terms that are above a first predetermined selectivity:
determining how many single word and high selectivity terms there are;
determining if there are ten or more single word and multiword terms that are high selectivity terms that have selectivities greater than a first predetermined selectivity;

when there are ten or more single word and multiword terms that are high selectivity terms that have selectivity greater than a first predetermined selectivity, displaying all of the ten or more single word and multiword terms; and when there are not ten or more single word and multiword terms that are high selectivity terms that have confidences greater than a first predetermined selectivity, displaying all single word and multiword terms that are high selectivity terms and that have confidences greater than a second predetermined selectivity.

6. The method of claim 5, wherein the step of displaying text further comprises the steps of:
determining a position of a cursor when a click occurs;
determining if the position is within a predetermined distance from one of a plurality of salient terms that are being displayed;
when the position is within the predetermined distance from one of the salient terms, performing the following steps:
determining which of the salient terms is near the position;
determining a time of the salient term; and
playing the speech document, beginning at the time.

7. The method of claim 5, wherein the steps of increasing and removing are performed by accessing the at least one transcript and creating processed text comprising the at least one transcript with the increased sentence and paragraph structure and with fewer non-word utterances.

8. The method of claim 5, wherein the step of displaying text in the at least one text transcript further comprises the step of making font size of the non-salient terms at least 10 points smaller than font size of the salient terms.

9. The method of claim 5, wherein the step of displaying text in the at least one text transcript further comprises the step of displaying the non-salient terms with non-text symbols.

10. The method of claim 5, wherein the step of displaying text in the at least one text transcript further comprises the step of displaying the non-salient terms wherein they are unreadable.

11. The method of claim 5, wherein the step of determining salient terms in the at least one text transcript further comprises the steps of:
determining high selectivity terms in the at least one text transcript; and
selecting terms from the high selectivity terms that are above a predetermined selectivity.

12. The method of claim 11, wherein the step of determining salient terms in the at least one text transcript further comprises the step of:
removing terms whose category is uncertain from the high selectivity terms.

13. The method of claim 11, wherein the step of determining high selectivity terms further comprises the step of determining selectivity of terms in the at least one text transcript and determining terms having a predetermined selectivity, and wherein the step of selecting terms further comprises the step of selecting terms having the predetermined selectivity that are above a predetermined threshold.

14. A system for processing text transcripts of speech after imperfect speech recognition, the system comprising:
a memory that stores computer-readable code; and
a processor operatively coupled to the memory, the processor configured to implement the computer-readable code, the computer-readable code configured to:

convert a speech document to text;
process the text to determine salient terms; and
display the text by emphasizing the salient terms and minimizing non-salient terms, wherein said salient terms are determined by:
determining high selectivity terms in the at least one text transcript;
determining how many high selectivity terms there are;
determining how many multiword and high selectivity terms there are that are above a first predetermined selectivity;
when there are ten or more high selectivity and multiword terms that have confidences greater than a first predetermined selectivity, displaying the ten or more high selectivity and multiword terms; and
when there are less than ten high selectivity and multiword terms that are above a first predetermined selectivity:
  determining how many single word and high selectivity terms there are;
  determining if there are ten or more single word and multiword terms that are high selectivity terms that have selectivities greater than a first predetermined selectivity;
  when there are ten or more single word and multiword terms that are high selectivity terms that have selectivity greater than a first predetermined selectivity, displaying all of the ten or more single word and multiword terms; and
  when there are not ten or more single word and multiword terms that are high selectivity terms that have confidences greater than a first predetermined selectivity, displaying all single word and multiword terms that are high selectivity terms and that have confidences greater than a second predetermined selectivity.

15. The system of claim 14, wherein the computer-readable code is further configured, when processing the text to determine salient terms, to:
increase sentence and paragraph structure in the text;
remove non-word utterances from the text;
determine high selectivity terms in the text; and
select terms from the high selectivity terms that are above a predetermined selectivity.

16. The system of claim 14, wherein the computer-readable code is further configured to:
select a salient term;
determine a time of the salient term relative to a beginning time of the speech document; and
play the speech document from the time of the salient term.

17. The system of claim 14, wherein the computer-readable code is further configured to create the speech document by recording a conversation, and wherein the computer-readable code is further configured, when converting a speech document to text, to perform speech recognition on the speech document, wherein any speakers of the speech have not trained the speech recognition system with their own speech.

18. A system for processing text transcripts of speech after imperfect speech recognition, the system comprising:
a memory that stores computer-readable code; and
a processor operatively coupled to the memory, the processor configured to implement the computer-readable code, the computer-readable code configured to:
convert a speech document to at least one text transcript;
increase sentence and paragraph structure in the at least one text transcript;
remove non-word utterances from the at least one text transcript;
determine salient terms in the at least one text transcript; and
display text of the at least one text transcript, the step of displaying performed to emphasize display of the salient terms relative to non-salient terms, wherein said salient terms are determined by:
determining high selectivity terms in the at least one text transcript;
determining how many high selectivity terms there are;
determining how many multiword and high selectivity terms there are that are above a first predetermined selectivity;
when there are ten or more high selectivity and multiword terms that have confidences greater than a first predetermined selectivity, displaying the ten or more high selectivity and multiword terms; and
when there are less than ten high selectivity and multiword terms that are above a first predetermined selectivity:
  determining how many single word and high selectivity terms there are;
  determining if there are ten or more single word and multiword terms that are high selectivity terms that have selectivities greater than a first predetermined selectivity;
  when there are ten or more single word and multiword terms that are high selectivity terms that have selectivity greater than a first predetermined selectivity, displaying all of the ten or more single word and multiword terms; and
  when there are not ten or more single word and multiword terms that are high selectivity terms that have confidences greater than a first predetermined selectivity, displaying all single word and multiword terms that are high selectivity terms and that have confidences greater than a second predetermined selectivity.

19. The system of claim 18, wherein computer-readable code is further configured, when displaying text, to:
determine a position of a cursor when a click occurs;
determine if the position is within a predetermined distance from one of a plurality of salient terms that are being displayed; and
when the position is within the predetermined distance from one of the salient terms, perform the following steps:
  determine which of the salient terms is near the position;
  determine a time of the salient term; and
  play the speech document, beginning at the time.

20. The system of claim 18, wherein computer-readable code is further configured, when determining salient terms in the at least one text transcript, to:
determine high selectivity terms in the at least one text transcript; and
select terms from the high selectivity terms that are above a predetermined selectivity.

21. The system of claim 20, wherein computer-readable code is further configured, when determining salient terms in the at least one text transcript, to:
remove terms whose category is uncertain from the high selectivity terms.

22. The system of claim 20, wherein computer-readable code is further configured, when determining high selectivity terms, to determine selectivity of terms in the at least one text transcript and determine terms having a predetermined selectivity, and wherein computer-readable code is further configured, when selecting terms, to select terms having the predetermined selectivity that are above a predetermined threshold.

23. An article of manufacture for processing text transcripts of speech after imperfect speech recognition, the article of manufacture comprising:
   a step to convert a speech document to text;
   a step to process the text to determine salient terms; and
   a step to display the text by emphasizing the salient terms and minimizing non-salient terms, wherein said salient terms are determined by:
   determining high selectivity terms in the at least one text transcript;
   determining how many high selectivity terms there are;
   determining how many multiword and high selectivity terms there are that are above a first predetermined selectivity;
   when there are ten or more high selectivity and multiword terms that have confidences greater than a first predetermined selectivity, displaying the ten or more high selectivity and multiword terms; and
   when there are less than ten high selectivity and multiword terms that are above a first predetermined selectivity:
      determining how many single word and high selectivity terms there are;
      determining if there are ten or more single word and multiword terms that are high selectivity terms that have selectivities greater than a first predetermined selectivity;
      when there are ten or more single word and multiword terms that are high selectivity terms that have selectivity greater than a first predetermined selectivity, displaying all of the ten or more single word and multiword terms; and
      when there are not ten or more single word and multiword terms that are high selectivity terms that have confidences greater than a first predetermined selectivity, displaying all single word and multiword terms that are high selectivity terms and that have confidences greater than a second predetermined selectivity.

24. The article of manufacture of claim 23, wherein the computer-readable code means further comprises, when processing the text to determine salient terms:
   a step to increase sentence and paragraph structure in the text;
   a step to remove non-word utterances from the text;
   a step to determine high selectivity terms in the text; and
   a step to select terms from the high selectivity terms that are above a predetermined selectivity.

25. The article of manufacture of claim 23, wherein the computer-readable code means further comprises:
   a step to select a salient term;
   a step to determine a time of the salient term relative to a beginning time of the speech document; and
   a step to play the speech document from the time of the salient term.

26. The article of manufacture of claim 23, wherein the computer-readable code is further configured to create the speech document by recording a conversation, and wherein the computer-readable code is further configured, when converting a speech document to text, to perform speech recognition on the speech document, wherein any speakers of the speech have not trained the speech recognition article of manufacture with their own speech.

27. An article of manufacture for processing text transcripts of speech after imperfect speech recognition, the article of manufacture comprising:
   a step to convert a speech document to at least one text transcript;
   a step to increase sentence and paragraph structure in the at least one text transcript;
   a step to remove non-word utterances from the at least one text transcript;
   a step to determine salient terms in the at least one text transcript; and
   a step to display text of the at least one text transcript, the step of displaying performed to emphasize display of the salient terms relative to non-salient terms, wherein said salient terms are determined by:
   determining high selectivity terms in the at least one text transcript;
   determining how many high selectivity terms there are;
   determining how many multiword and high selectivity terms there are that are above a first predetermined selectivity;
   when there are ten or more high selectivity and multiword terms that have confidences greater than a first predetermined selectivity, displaying the ten or more high selectivity and multiword terms; and
   when there are less than ten high selectivity and multiword terms that are above a first predetermined selectivity:
      determining how many single word and high selectivity terms there are;
      determining if there are ten or more single word and multiword terms that are high selectivity terms that have selectivities greater than a first predetermined selectivity;
      when there are ten or more single word and multiword terms that are high selectivity terms that have selectivity greater than a first predetermined selectivity, displaying all of the ten or more single word and multiword terms; and
      when there are not ten or more single word and multiword terms that are high selectivity terms that have confidences greater than a first predetermined selectivity, displaying all single word and multiword terms that are high selectivity terms and that have confidences greater than a second predetermined selectivity.

28. The article of manufacture of claim 27, wherein computer-readable code means further comprises, when displaying text:
   a step to determine a position of a cursor when a click occurs;
   a step to determine if the position is within a predetermined distance from one of a plurality of salient terms that are being displayed; and
   when the position is within the predetermined distance from one of the salient terms, the following steps:
      a step to determine which of the salient terms is near the position;
      a step to determine a time of the salient term; and
      a step to play the speech document, beginning at the time.

29. The article of manufacture of claim 27, wherein computer-readable code means further comprises, when determining salient terms in the at least one text transcript:
- a step to determine high selectivity terms in the at least one text transcript; and
- a step to select terms from the high selectivity terms that are above a predetermined selectivity.

30. The article of manufacture of claim 29, wherein computer-readable code means further comprises, when determining salient terms in the at least one text transcript:
- a step to remove terms whose category is uncertain from the high selectivity terms.

31. The article of manufacture of claim 29, wherein computer-readable code i means further comprises, when determining high selectivity terms, a step to determine selectivity of terms in the at least one text transcript and a step to determine terms having a predetermined selectivity, and wherein computer-readable code means further comprises, when selecting terms, a step to select terms having the predetermined selectivity that are above a predetermined threshold.

\* \* \* \* \*

UNITED STATES PATENT AND TRADEMARK OFFICE
CERTIFICATE OF CORRECTION

PATENT NO. : 6,973,428 B2  Page 1 of 1
APPLICATION NO. : 09/864982
DATED : December 6, 2005
INVENTOR(S) : Boguraev et al.

It is certified that error appears in the above-identified patent and that said Letters Patent is hereby corrected as shown below:

In column 20, line 2, before "means" and after "code" delete -- i --.

Signed and Sealed this

Twenty-second Day of August, 2006

JON W. DUDAS
*Director of the United States Patent and Trademark Office*